United States Patent Office 3,486,910
Patented Dec. 30, 1969

3,486,910
PROCESS FOR PRODUCING A PRECOOKED
DEHYDRATED MEAT PRODUCT
William Saenz, Sudbury, Mass., assignor to Corn Products Company, New York, N.Y., a corporation of Delaware
No Drawing. Filed July 18, 1966, Ser. No. 565,755
Int. Cl. A23b 1/04; A22c
U.S. Cl. 99—208      4 Claims

ABSTRACT OF THE DISCLOSURE

The process of this invention involves forming a slurry in water of 20 to 80 parts of finely ground raw meat, with 80 to 20 parts of cooked meat consisting of ground cooked meat and cooked meat fibers. The fibers are present in sufficient quantity to define a matrix in the end product. At least 30 parts of water are present in the slurry for each 100 parts by weight of meat. The slurry is cooked, without agitation, to form a self-supporting porous precooked structure in which the ground cooked meat is bound by the coagulated ground raw meat into a matrix defined by the cooked meat fibers. This precooked material is then diced into bite-size pieces, and the pieces are dehydrated to a moisture content of less than 5%.

The process can be used to produce pieces that are 100% meat. They can be used directly in dehydrated soup mixes and in other food preparations.

---

The present invention relates to preserved foodstuffs, and particularly to a process for producing a novel dehydrated precooked meat product which has the characteristic of quick reconstitution and exhibits superior organoleptic properties.

The art of preserving foodstuffs by dehydration has advanced to a high degree of sophistication since its ancient origin. Nevertheless, the special requirements for economical high quality, quick-cooking dehydrated foodstuffs created by today's convenience-oriented market have not been met in full by the techniques developed to date.

Preferred methods of dehydration from the point of view of producing a high quality product are those that bring about the water removal at very low temperatures; for example, freeze drying. However, the widespread application of freeze dehydration to the production of foods has been curtailed because of the high processing costs involved. Air drying, on the other hand, provides the opportunity of preserving foodstuffs at reasonable and competitive prices, but the products thus produced, particularly in the case of bite-sized or larger meat products, require long reconstitution times and are furthermore often tough in texture. Air dehydrated loaves formed of finely ground pre-cooked meat pieces are crumbly and either fall apart during cooking or leave a gritty sensation in the mouth, while air dehydrated sausage-like agglomerations formed of finely ground raw meat pieces require long reconstitution times (which are really cooking times) and have an overly dense or rubbery texture.

Attempts to form ersatz meat products using a complete or partial substitution of vegetable protein, for example soy bean protein, for natural animal meat have not been completely successful. Even certain ingenious techniques involving the spinning of protein fibers to resemble natural meat fiber have failed to gain wide acceptability, the main drawbacks being atypical texture and foreign flavor. In addition, the cost of some of the better vegetable spun fibers is comparable to various meats and, since government regulations typically prescribe a minimum percentage of a given meat in a product bearing the meat name, the cost of such an ersatz meat product would exceed that of the animal natural meat product.

Other attempts, specifically one referring to poultry, incorporate poultry meat pieces in a meltable matrix of emulsified poultry by-product particles, encase the mixture thus formed, and then successively heat and cool the encased mixture to form a thermoplastic non-porous loaf. The fusible loaf, although firm at room temperature, when heated losses its structural form and becomes a juice or sauce-like material. While the product, generally known in the trade as a "poultry roll," enjoys some degree of success as a frozen or refrigerated item, it does not lend itself to preservation by dehydration techniques. The lack of porosity charcteristic of the loaf indicates that along reconstitution time would be required under ambient temperature conditions, and the thermoplasticity of the loaf indicates that use of higher temperatures during reconstitution would result, after cooling of the reconstituted loaf, in an amorphous product. Furthermore when large meat fragments are used in formation of the loaf, these pieces upon dehydration become tough and very difficult to reconstitute. A major drawback of the loaves resulting from these attempts has been the need to encase the loaves to overcome the product's natural lack of cohesiveness, especially at higher temperatures.

It is an object of the present invention to provide an air dehydrated foodstuff which is substantially all meat and which can be reconstituted into a tender, chewy, bite-sized product, for example an 8 to 16 mm. dice, in a short time, for example 2 to 3 minutes. A further object of the present invention is to provide an economical dehydrated meat piece product that, after reconstitution, possesses desirable organoleptic attributes, for instance, its texture being at the same time tender and yet chewy like the original parent meat.

The advantages of an air dehydrated meat piece characterized by a rapid reconstitution time, a recognizable bite size and good organoleptic properties are obvious to all skilled in the art. Equally, the uses of such meat pieces, beyond their obvious application to dehydrated soups, casseroles and ready-to-cook meals, are only limited by the ability of those skilled in the art of formulation.

The objects and advantages of the present invention are obtained by preparing a slurry comprising (1) ground raw meat, (2) ground cooked meat, (3) cooked meat fibers, and (4) water; precooking the slurry in the absence of agitation to form a porous structure having the characteristic that the ground cooked meat is bound by the ground raw meat into a matrix defined by the cooked meat fibers; dicing the porous structure into bite size pieces; and dehydrating the pieces by air drying.

It is tentatively theorized that the resultant structure of the dehydrated foodstuff is analagous to that of reinforced concrete. In reinforced concrete, a metal rod lattice provides structural strength for a cement binder containing an non-binding rock expander or filler. In the novel foodstuff, according to this theory, the cooked meat fibers provide a lattice to which the ground cooked meat expander is attached by a binder of ground raw meat. The lattice work of cooked meat fibers strengthens the product to provide a degree of texture or chewiness similar to that of the fresh cooked parent meat, and also holds water in excess of the amount that can be held by the other ingredients. The cooked ground meat is bound into the lattice as an expander, the cooked ground meat by itself having relatively little texture or chewiness, but providing a desirable meat flavor and reducing the density of the final product below the rubbery level which would characterize an all raw meat product. The cooked ground meat is furthermore capable of holding water by absorption and/or adsorption, and so acts as a sponge prior to dehydration; dehydration removes this water, thereby breaking the continuity of the meat piece and resulting in a porous structure which is easily and swiftly reconstitutable. As neither of the cooked meats have any substantial binding properties, it is necessary to introduce the ground raw meat which provides coagulable proteins, such as albumen and gelatin, to bind the ground cooked meat to the cooked meat fibers, as in the reinforced concrete analogy, the cement binds the rock to the rods. The ground raw meat binder also affords support and body to the meat piece without introducing any toughness thereto. Finally, the ground raw meat binder assists in the retention of salt and other flavoring adjuncts added to the meat piece.

The first step of the present process is the preparation of a slurry comprising ground raw meat, ground cooked meat, cooked meat fibers, and water. The ingredients of the slurry may be satisfactorily blended in a rotary mixer with planetary action or by other means of blending or mixing well recognized in the art. Prolonged mixing accompanied by severe shearing should be avoided as causing greater weight losses during the precooking step and resulting in a somewhat tough and rubbery final product.

Generally, the slurry contains from 20 to 80 parts of raw meat, from 80 to 20 parts of cooked meat, and from 30 to 80 parts of water, based on 100 parts by weight of meat, including both raw and cooked meats. Approximately equal weights of cooked and raw meats have been found to provide a preferred product, an excessive proportion of cooked meat causing the final product to be crumbly and grainy while an excessive proportion of raw meat makes reconstitution difficult and the final product dense and tough. Similarly, the distribution of cooked meat is generally preferred to be from 40 to 60 parts of cooked ground meat for every 60 to 40 parts of cooked meat fibers, with approximately equal parts by weight of ground cooked meat and cooked meat fibers providing an especially preferred product. While the optimum amount of water required in the slurry will be somewhat dependent upon the water binding properties of the particular meat, generally about 65 parts of water based on 100 parts by weight of meat results in a preferred product. An excessive amount of water results in a soft spongy loaf which is difficult to cut, while an insufficient amount of water results in a dense, hard loaf which is also difficult to cut, hard to reconstitute and grainy due to hardened non-reconstituted elements. The criticality of the water content of the slurry will be further discussed below in connection with the pre-cooking operation. A preferred slurry may therefore contain about 50 parts of ground raw meat, 25 parts of ground cooked meat, 25 parts of cooked meat fibers, and 65 parts of water, based on 100 parts by weight of meat.

It will be understood by those familiar with this art that the slurry can further include a minor fraction of other constituents, whether liquid or solid. These constituents can be flavor or fortification additives and may include vitamins, spices, flavor enhancers exogenous or natural fats, antioxidants, egg albumen, pickling or curing salts and the like. In particular, the inclusion in the slurry of from about 0.1 to 25 parts of exogenous fat, and preferably about 10 parts of fat based on 100 parts by weight of meat, has been found especially useful in improving the texture and mouthfeel or the final product, as well as incidentally acting as a suitable solvent for antioxidants. On the other hand, exogenous fat levels in excess of 25% of the total weight of meat cause inconveniences during dehydration and result in a final product having a fatty flavor. Small amounts of egg albumen contribute an additional binding property to the blend and furthermore impart a desirable mouthfeel and bite to the final product. Small amounts of lecithin and various emulsifiers may also be used to improve the fat retention or improve the fat distribution.

Turning now to the description of the meat ingredients in the slurry, it is noted preliminarily that they may be prepared either from fresh meats or suitably thawed frozen meats; for example, beef (including veal), poultry (including chicken), pork and other meats. While the ground meats need not be of the top grades or prime cuts, the meat from which the meat fibers are obtained is preferably possessed of long parallel fibers and reasonably free of skin, gristle and fat. Cooking of the meats may be performed by boiling in water, steaming in steam, roasting in an oven or by other means well recognized in the culinary art.

The ground raw meat, which acts as a binder between the ground cooked meat and the cooked meat fibers, is prepared by finely mincing or chopping whole raw meat by means well known in the art, such as a high speed cutter or a silent or bowl cutter. Comminution of the whole raw meat is facilitated by use in the cutter of a portion of the water to be eventually incorporated in the slurry, preferably about 20 to 50 parts water, based on 100 parts of weight of raw meat. The resulting emulsion has a fine texture and is moderately free-flowing. Microscopic examination of the emulsion indicates a gel structure with only a few discernible fibers. The use of substantially larger ground raw meat pieces results in a tough final product which is leathery and hard to chew, and furthermore results in a dry, grainy final product which gives an undesirably gritty sensation in the mouth. Use of ground raw meat pieces which are substantially too large also yields a final product which is difficult to reconstitute.

The ground cooked meat, which acts as a non-binding expander, is preferably prepared by the grinding of whole cooked meat rather than the cooking of ground raw meat. While the exact sizes of the ground cooked meat pieces are not critical, the ground cooked meat pieces are desirably compatible in size with the other meat ingredients in the slurry, in view of their function. Suitably ground cooked meat may be prepared, for example, by grinding cooked meat to a particulate size, say, by passing it through a meat grinder fitted with a mincing plate having a multitude of approximately 2.4 mm. diameter holes, thereby producing pieces of majority of which have approximately the following dimensions: 0.1 mm. diameter x 0.8 mm. length.

The cooked meat fibers, which act as a lattice matrix, may be produced by cooking selected straight-fiber muscle meat, dicing and pressing the cooked fibers (as by dicing the cooked meat into 22.7 mm. dices and then passing the dices between rollers spaced apart 0.8 mm.) and suspending the pressed fibers in agitated water. Alternatively, the cooked meat fibers may be obtained by other means well known in the art, for example, by mincing cooked meat with a silent or bowl cutter for several minutes. A preferred separation or dispersion of the cooked meat fibers without appreciable bundling or clumping is obtained when a portion of the water to be eventually incorporated in the slurry is used to separate an equal weight of fibers in a low speed mixer set at 80 to 100 r.p.m. Generally, the cooked meat fibers have the following dimensions: a diameter from 150 to 300 microns and a length of from about 0.1 to 3.2 mm.

It will be noted from the above descriptions that the total water required by the slurry formulation may conveniently be added as part of the ground raw meat and cooked meat fiber ingredients or instead all or a portion of the water may be added separately as a distinct ingredient. Preferably the slurry is prepared by first mixing the watered ingredients, and then adding the solid or ground cooked meat ingredients to the mixture.

As indicated in Example II below, both the ground cooked meat and the cooked meat fibers may be formed in a single operation by shredding the cooked meat in such a manner as to produce not only fibers of suitable length for the cooked fiber ingredient, but also fibers of such short length as to be appropriately deemed elements of the ground cooked meat ingredient. For example, shredding in a silent cutter for from about 2 to 4 minutes will produce both cooked meat ingredients in from a 3:1 to 1:3 ratio of cooked meat fibers to ground cooked meat.

The second step of the novel process involves precooking the slurry prepared as described above, in the absence of agitation, for a time sufficient to develop therein the characteristics of the final product as eaten or for just a slightly shorter time. Generally a preferred final product may be obtained by precooking the slurry in hot water or steam until the center of the resultant mass reaches an internal temperature of from about 75° to 85° C. As the cooked meat fibers forming the lattice of the slurry do not curl up or shrivel during the precook step, the final product has a self-supporting structure which requires no casing and which will afford chew and texture to the pleasure of the ultimate consumer.

While a teaching of the prior art indicates the need for cooking meat slurries in perforated or permeable casings in order to permit the removal of gelatin from the meat into the cooking medium, no noticeable gelatin leaching occurs during the precooking step of the novel process. Accordingly, precooking may be performed in any suitable container, for example, impermeable metal molds, slightly permeable shaped cellulose casings, or even perforated fibrous wraps.

Interestingly, a sharp distinction must be made between the formulation water used in the novel process and the precooking water. Even when the slurry is precooked in only a perforated or permeable casing, the precook water is not the functional equivalent of formulation water as the slurry loses, rather than gains, water during the precooking step. This is not entirely unexpected in view of the profuse literature references to cooking losses in meats, for example water losses of from 14 to 20% and more for the cooking of raw poultry. As cooked poultry meat has no appreciable water binding capacity, the water losses may be even larger when cooked poultry meat is heated. Accordingly, it is readily understandable that, as the slurry used in the novel process contains added water in excess of what the raw and cooked meats combined can hold, the slurry will not "pick up" cooking water and, in fact, a portion of the formulation water used in the novel process will be rendered out of the slurry during precook, thereby increasing the porosity of the structure.

The amount of water rendered out of the slurry during the precook step will vary somewhat with the precooking technique. For example, 100 part samples of a typical slurry composed of 74 parts water and 26 parts solids were precooked in different containers immersed in cooking water. The amount of water rendered out of the meat mixture and the solids content in the water rendered out were recorded for each immersed container as follows:

| Immersed Container | Water Rendered Out of Meat Mixture, parts | Solids Content in Water Rendered Out, parts |
| --- | --- | --- |
| Glass capsule (vented to air) | 18 | 3 |
| Intact fibrous casing | 30 | 4 |
| Perforated fibrous casing | 33 | 3 |

Accordingly, precooking may be effected in a low-permeable casing material, such as a metal mold or impermeable casing, to minimize the water loss during the precooking step and thereby maximize the water loss during the dehydration step or in a high-permeable casing material, such as a perforated casing, to maximize the water loss during the precooking step and thereby minimize the water loss required during the dehydration step.

It has been hypothesized that during precooking the outer meat surfaces coagulate before the meat interiors so that the coagulated outer meat surfaces thereafter retard the entrance of the cooking water into the meat interiors despite any porosity of the structure. The addition of such hydrophylic ingredients as bread crumbs to the slurry retards the water loss during precooking, the bread crumbs presumbly acting as a sponge for the water.

The porous precooked structure is next removed from the cooking container or casing and cut or diced into bite size pieces having dimensions on the order of 8 to 16 mm. Although the precooked structure may be cut at room temperature, a more regular dicing effect is obtained by cooling it prior to dicing, preferably to just above its freezing point.

The diced pieces are then dehydrated, according to conventional practice, in a hot air oven at temperatures which do not deleteriously affect the finished product. For example, diced chicken pieces may be air dried in a cross draft drier at temperatures of from 65 to 82° C. with an air velocity of approximately 300 liters per second across the pieces. The moisture content of the dehydrated diced pieces is preferably reduced to not more than 5% of the total weight thereof. During the dehydration step, the bulk of the water remaining after the precooking step is removed, thereby increasing the porosity of the pieces. This porosity of the dehydrated product permits reconstitution times which are comparable to or less than those which would characterize analogous freeze dried products.

The dehydrated pieces may be reconstituted in boiling water within three minutes, or by other means well known in the art, alone or as part of a soup or casserole, to provide juicy meat pieces having an excellent texture and bite resulting from their novel structure. Neither the toughness characteristic of cooked meat fibers, nor the rubber texture characteristic of raw ground meat, nor the grittiness characteristic of ground cooked meat are distinctly noticeable in the reconstituted product.

In the following examples representing specific embodiments of the instant invention, all parts are by weight.

EXAMPLE I

Approximately 12 kg. of fowl were cooked by boiling in 5 liters of water until tender (circa 2.5 hours). The meat was removed from the bones and the fat skimmed from the broth, both meat and fat being set aside for later use. Raw chickens were deboned to obtain 3.8 kg. of natural proportion meat, including skin. The raw meat was then comminuted in a Waring Blendor adding 1.1 liters of water to facilitate homogenization.

The straight-fibered muscles in the cooked meat, including most of the white and some gristle-free dark meat, were cubed to about 1 to 2 cm. Of these, 1.9 kg. were rolled between steel rollers separated 0.8 mm. and then agitated at low speed with 3.2 liters of water for about 30 minutes until the fibers were separated and formed a loose mat. The remainder of the cooked meat about 1.9 kg., was ground by passing it twice through a meat chopper, the chopper on the initial pass being equipped with a 3.2 mm. plate and on the final pass with a 2.4 mm. plate.

The meats were mixed together for 5 minutes in a Hobart mixer with the following adjuncts: melted hydrogenated fat—425 g.; chicken fat—225 g.; salt—170 g. monosodium glutamate (MSG)—170 g.

The almost homogeneous slurry blend was placed in a metal mold and cooked in a water bath until the temperature in the center reached 82° C. The resultant loaf structure was then cooled and cut into dice of approximately 7.5 to 13 mm.

The dice were then dehydrated in a cross-draft air dryer, using a temperature of 71° C. and an air velocity of 300 liters per second, to a final moisture content of from 3 to 4% by weight.

The dehydrated formed meat dices thus prepared were reconstituted and ready to eat after two minutes reconstitution in boiling water. The product thus produced had an excellent texture, a mild chicken flavor and aroma, and the appearance of diced fresh cooked chicken.

EXAMPLE II

Approximately 250 parts of natural proportion deboned raw chicken meat were comminuted in a silent cutter without water until a fine emulsion-like mass (similar to that used in the preparation of sausages) was obtained.

Separately, about 250 parts of natural proportion deboned cooked (boiled) chicken meat, free of gristle, were shredded in the silent cutter until fibers ranging in length from about 1.6 to 6.4 mm. were obtained. It should be obvious that many smaller fragments or fines suitable for use as ground cooked meat were also produced and for this reason no additional ground cooked meat was required. The shredded cooked fibers were suspended in 275 parts of water and agitated in a Hobart mixer at low speed until a fluffy mat was obtained.

To a slurry mixture of the raw and cooked meats, the following adjuncts were added: 30 parts hydrogenated fat, 12 parts salt and 12 parts MSG.

The operating procedures and conditions except as indicated above were analogous to those of Example I.

EXAMPLE III

A slurry was prepared from the following ingredients:

|  | Parts |
|---|---|
| Ground raw meat | 300 |
| Cooked chicken meat, shredded fibers and fines combined | 100 |
| Melted hydrogenated fat | 60 |
| MSG | 4 |
| Salt | 4 |
| Water | 225 |

Operating procedures and conditions were the same as those of Example II. The resultant product possessed excellent organoleptic properties and was formulated in a variety of dishes, including a dehydrated soup, a dehydrated casserole, dehydrated chicken dishes with a la king and fricassee sauces. The product cubes were also reconstituted and then mixed in a cold salad.

The above examples have dealt exclusively with the flesh of poultry animals, and in particular chickens, but the novel process is also applicable to the flesh of other edible animals.

EXAMPLE IV

A slurry was prepared from the following ingredients:

|  | Parts |
|---|---|
| Ground raw beef meat | 200 |
| Ground cooked beef meat | 50 |
| Cooked beef meat fibers | 50 |
| Water | 120 |
| Fat (hydrogenated peanut oil) | 25 |
| Salt | 6 |
| MSG | 4 |
| Onion powder | 0.7 |

The operating procedures and conditions were the same as in Examples II and III except that the cooked meat was prepared by roasting in an oven rather than by boiling.

The resulting formed meat piece, upon reconstitution, had a good texture, and its flavor and aroma resembled those of roast beef. The product cubes were also formulated in a variety of dehydrated and fresh dishes.

In view of the foregoing description of the preferred embodiments of the present invention, various modifications and alternatives will be readily apparent to those skilled in the art. For example, inexpensive cereal-type farinaceous or proteinaceous extenders may be included in the slurry formulation to produce a more economical meat piece. Furthermore, different types of meats, for example chicken and turkey, may be used in a single slurry formulation to produce a final product having an unusual and interesting flavor. Accordingly, this invention is to be construed as limited only by the spirit and scope of the appended claims.

What is claimed is:

1. A process for producing a precooked dehydrated meat product, comprising:

preparing a slurry from: 20 to 80 parts by weight of finely ground raw meat; 80 to 20 parts by weight of cooked meat consisting of ground cooked meat and a sufficient quantity of cooked meat fibers to function to define a matrix in the food product; and at least 30 parts of water by weight for each 100 parts by weight of total meat;

precooking said slurry, in the absence of agitation, to develop an internal temperature in the range from about 75° C. to about 85° C., to cause coagulation of the meat surfaces and to form a porous precooked structure having the characteristic that said ground cooked meat is bound by said coagulated, finely ground raw meat into a matrix defined by said cooked meat fibers;

dicing said porous precooked structure to form bite-sized pieces, and dehydrating said bite-sized pieces by hot air drying to a moisture content of not more than 5% based on the total weight thereof.

2. A process in accordance with claim 1 wherein said slurry includes from 30 to 80 parts of water by weight and from 0.1 to 25 parts of exogenous fat, both based on 100 parts by weight of meat.

3. A process in accordance with claim 1 wherein said slurry comprises approximately 50 parts of said finely ground raw meat, 25 parts of said ground cooked meat, 25 parts of said cooked meat fibers, and 65 parts of water based on 100 parts of said meats, all said parts being by weight.

4. A precooked, porous, meat product in the form of bite-size pieces dehydrated to a moisture content of not more than about 5% by weight, each formed from a precooked, coagulated slurry of 20 to 80 parts of finely ground raw meat, 80 to 20 parts of cooked meat consisting of ground cooked meat and cooked meat fibers, the fibers being present in sufficient quantity to function to define a matrix for the precooked product, and at least 30 parts of water for each 100 parts of total meat, all parts being by weight, and wherein, in each said piece, said ground cooked meat is bound by said coagulated ground raw meat into a matrix defined by said cooked meat fibers, said meat food product being prepared in accordance with the process of claim 1.

References Cited

UNITED STATES PATENTS

| 2,820,709 | 1/1958 | Schack et al. | 99—108 |
| 3,083,108 | 3/1963 | Kline et al. | 99—208 |
| 3,235,971 | 2/1966 | Jooby. | |
| 3,253,931 | 5/1966 | Coleman et al. | 99—208 |
| 3,285,752 | 11/1966 | Hansen et al. | 99—107 |

HYMAN LORD, Primary Examiner

U.S. Cl. X.R.

99—107, 108